US00RE46532E

(19) United States
(12) Reissued Patent
Paapsi

(10) Patent Number: US RE46,532 E
(45) Date of Reissued Patent: Sep. 5, 2017

(54) FIRE LOG WITH BURN CHANNELS

(71) Applicant: Margus Paapsi, Tartumaa (EE)

(72) Inventor: Margus Paapsi, Tartumaa (EE)

(21) Appl. No.: 29/542,287

(22) Filed: Oct. 13, 2015

Related U.S. Patent Documents

Reissue of:
(64) Patent No.: Des. 713,954
Issued: Sep. 23, 2014
Appl. No.: 29/486,552
Filed: Mar. 31, 2014

(30) Foreign Application Priority Data

Oct. 11, 2013 (EM) ..... 002324608

(51) LOC (10) Cl. ..... 23-03
(52) U.S. Cl.
USPC ..... D23/409
(58) Field of Classification Search
USPC ..... D23/403, 407, 409, 410, 415, 499; D7/407; D13/100

(Continued)

(56) References Cited

U.S. PATENT DOCUMENTS

D33,836 S * 1/1901 Van Buren ..... D23/422
1,050,535 A * 1/1913 Hartung ..... 44/572

(Continued)

FOREIGN PATENT DOCUMENTS

CH 697091 A5 4/2008
DE 362075 10/1922

(Continued)

OTHER PUBLICATIONS

Screenshots from "How to make a swedish torch," video uploaded by Doogly13 on Jan. 10, 2011, viewed at http://www.youtube.com/watch?v=vjQRLQTNsJo&feature=related on Apr. 19, 2012, 4 pages.

(Continued)

*Primary Examiner* — Phillip S Hyder
(74) *Attorney, Agent, or Firm* — Westman, Champlin & Koehler, P.A.; Amanda M. Prose; James L. Young

(57) CLAIM

The ornamental design for a fire log with burn channels, as shown and described.

DESCRIPTION

FIG. 1 is a top and front perspective view of a fire log with burn channels;
FIG. 2 is an end perspective view of the fire log with burn channels of FIG. 1 (from the rear);
FIG. 3 is a top and side perspective view of the fire log with burn channels of FIG. 1;
FIG. 4 is a bottom and front perspective view of the fire log with burn channels of FIG. 1;
FIG. 5 is a top perspective view of the fire log with burn channels of FIG. 1;
FIG. 6 is a bottom perspective view of the fire log with burn channels of FIG. 1;
FIG. 7 is an end perspective view of the fire log with burn channels of FIG. 1 (from the front);
FIG. 8 is a side perspective view of the fire log with burn channels of FIG. 1 (from the right); and,
FIG. 9 is a side perspective view of the fire log with burn channels of FIG. 1 (from the left).
The broken lines in the drawings represent portions of the fire log with burn channels that are not included in the claim. The broken lines form no part of the claimed design.

1 Claim, 7 Drawing Sheets

Figure 1:
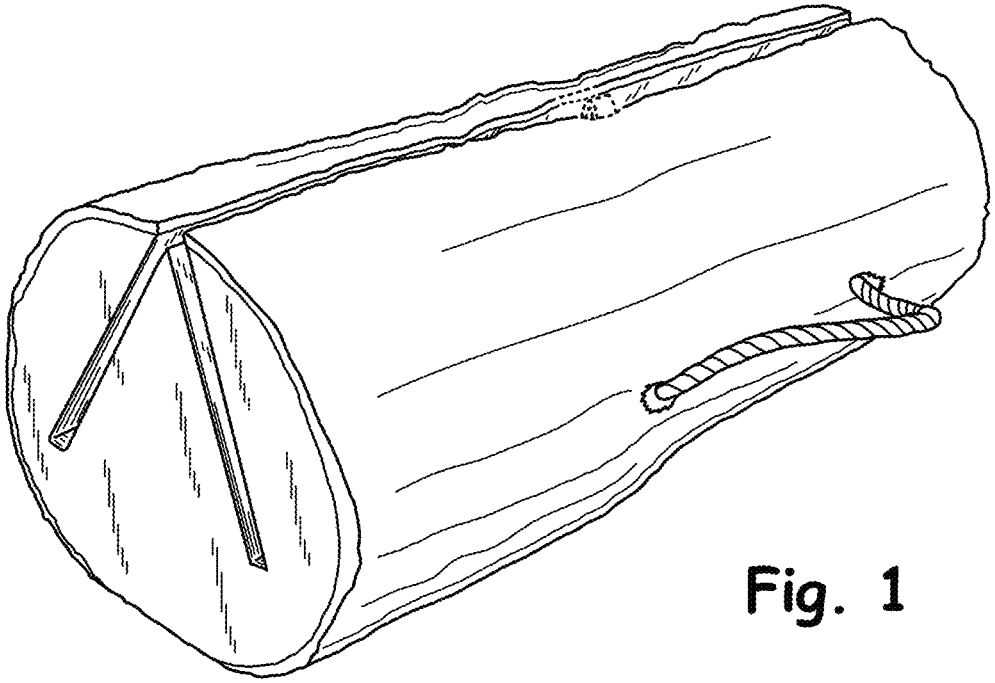
Figure 2:
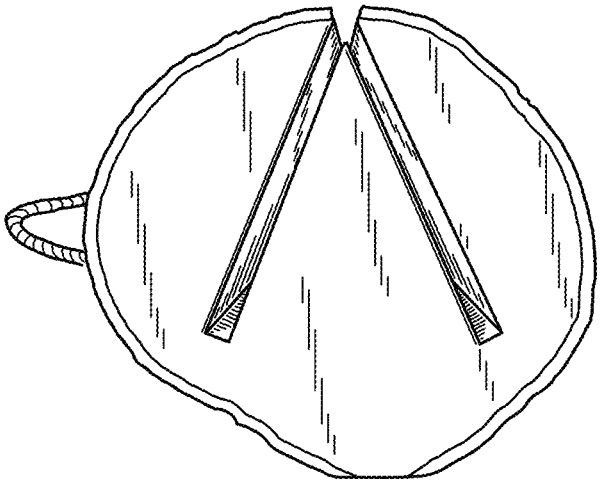
Figure 7:
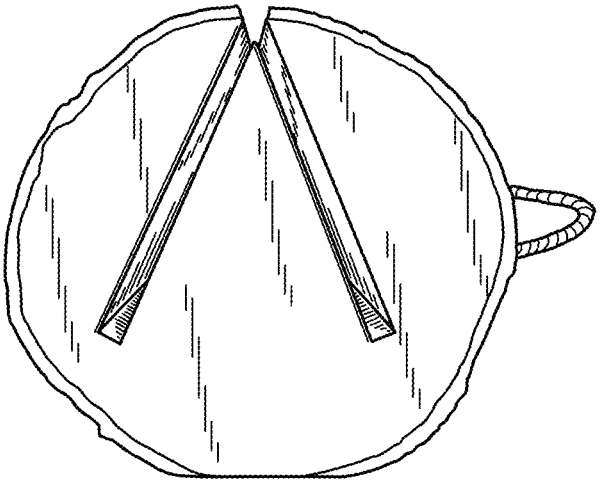
Figure 3:
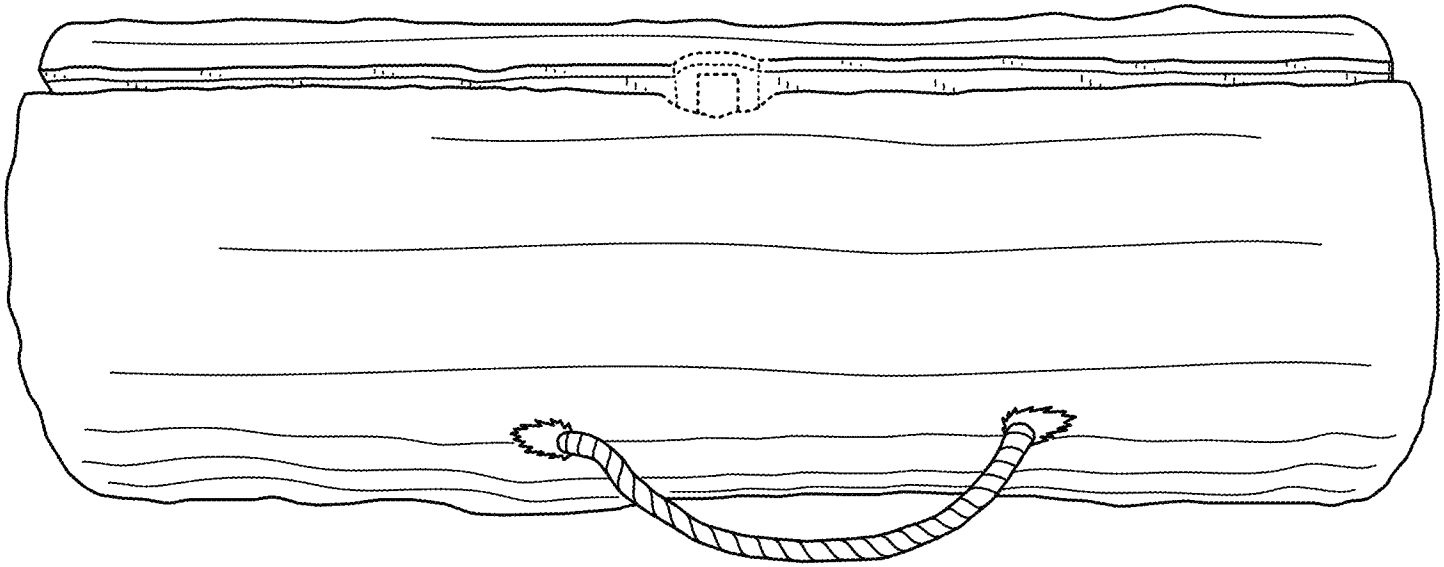
Figure 4:
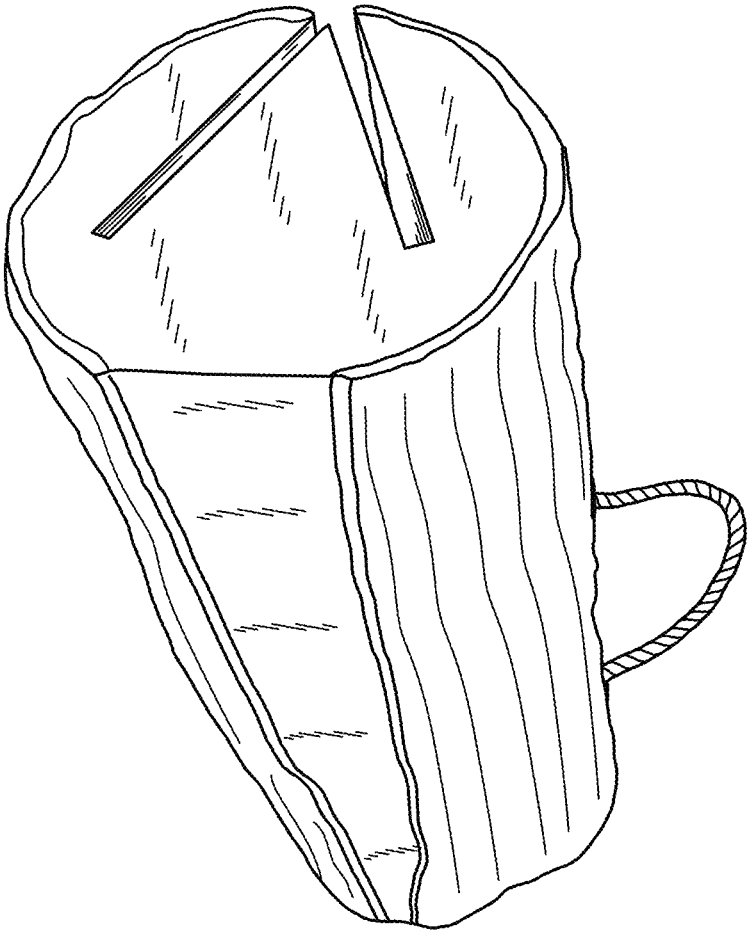
Figure 5:
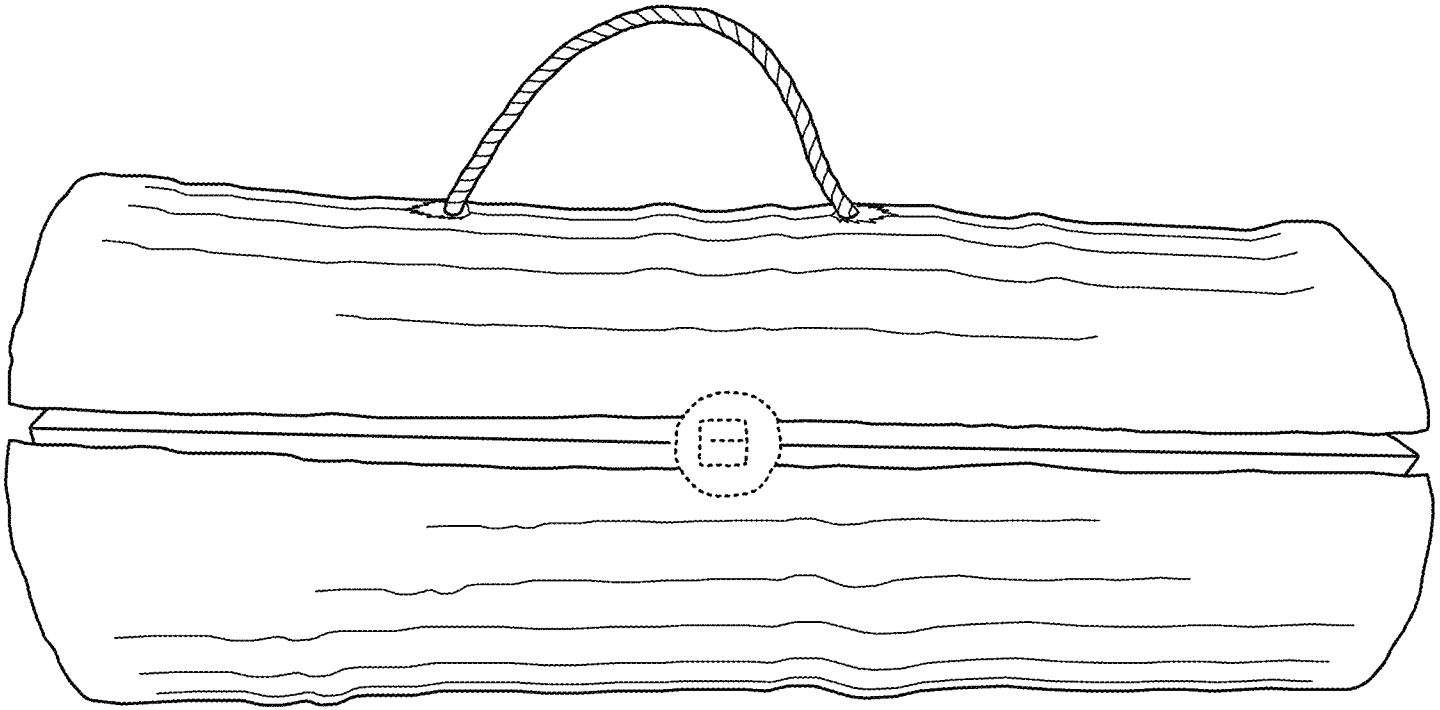
Figure 6:
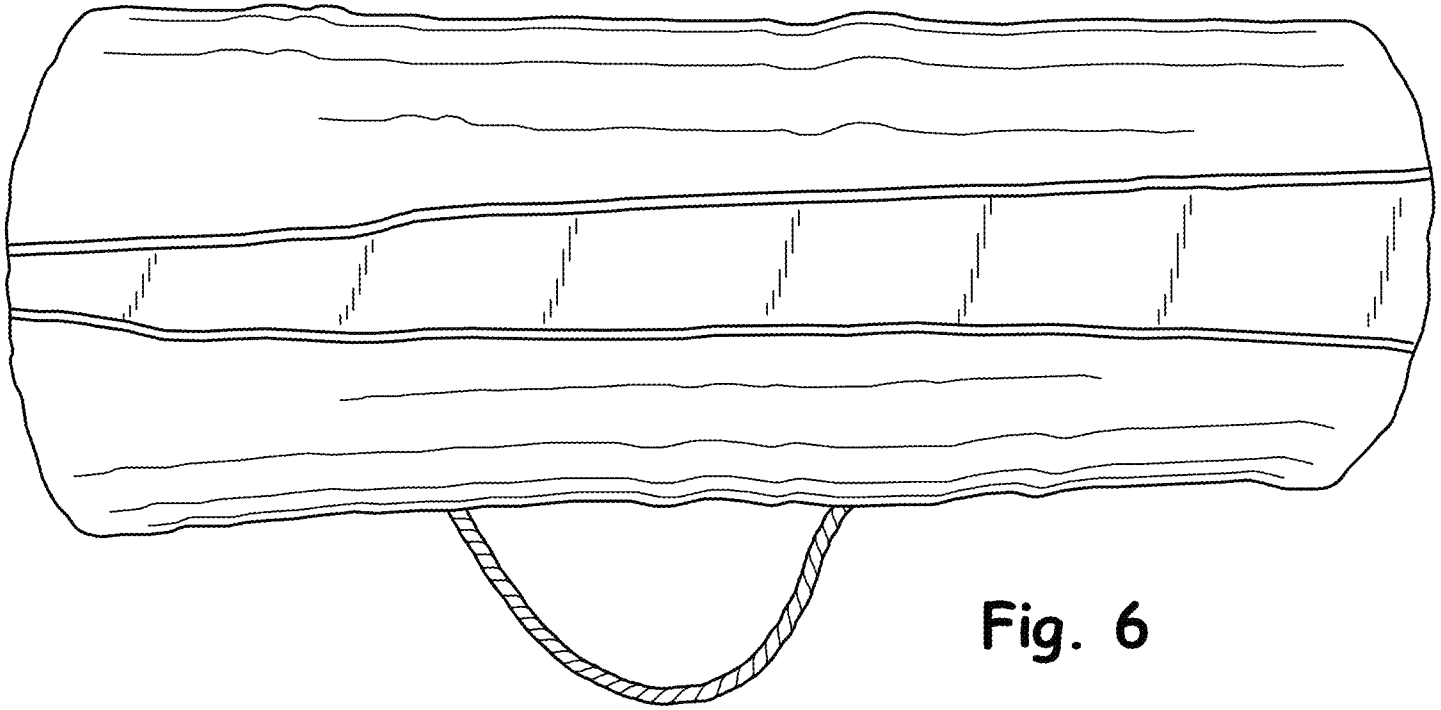
Figure 8:
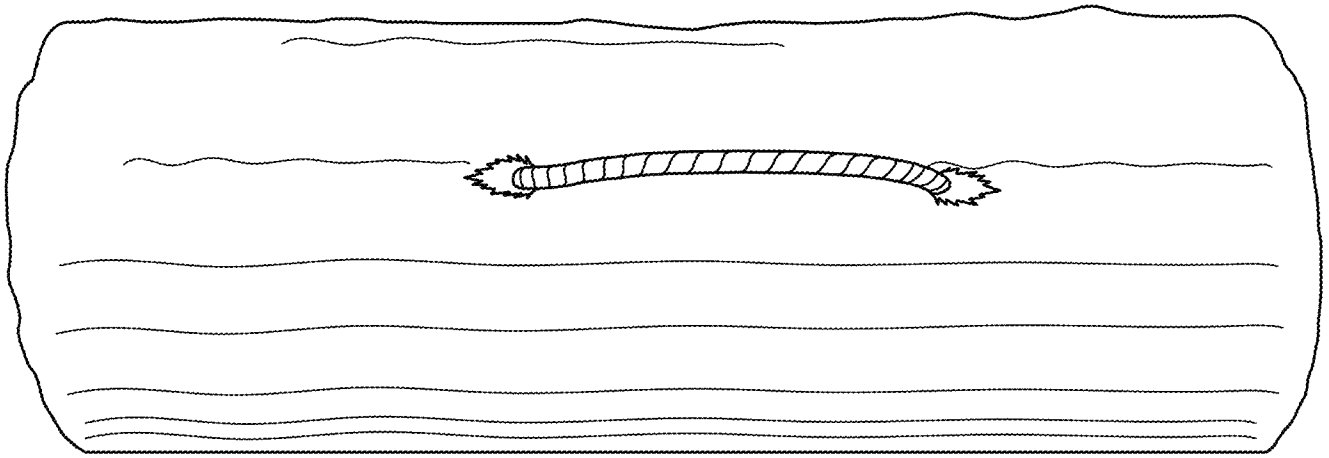
Figure 9:
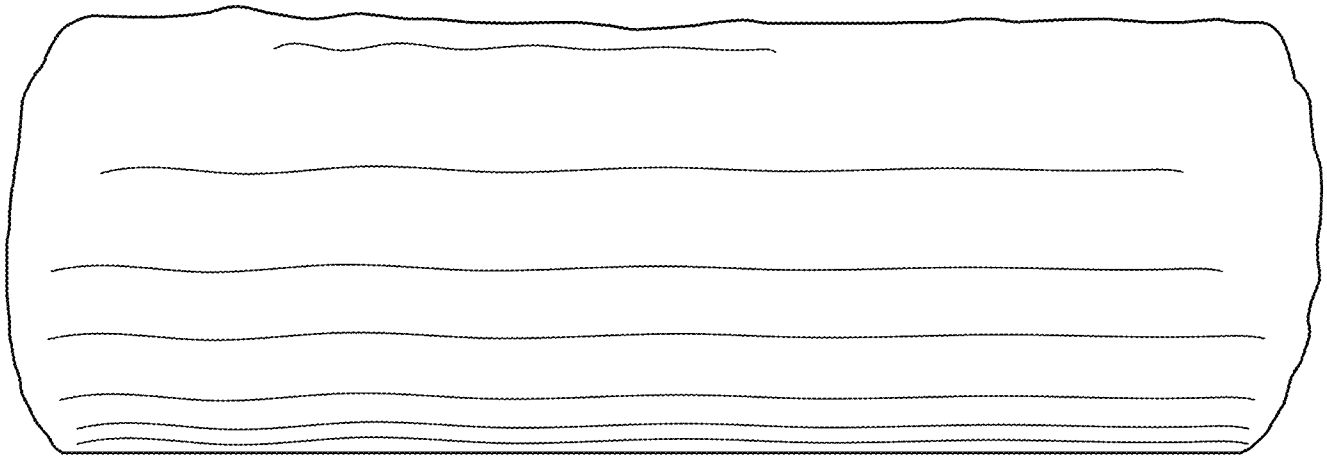

Matter enclosed in heavy brackets [ ] appears in the original patent but forms no part of this reissue; matter printed in italics indicates the additions made by reissue.

(58) Field of Classification Search
CPC ..... C10L 5/365; C10L 11/06; C10L 11/00; C10L 11/04
See application file for complete search history.

(56) References Cited

U.S. PATENT DOCUMENTS

| | | | | | |
|---|---|---|---|---|---|
| 1,310,004 | A | * | 7/1919 | Coleman | 44/530 |
| 1,404,497 | A | * | 1/1922 | Vetter et al. | 392/348 |
| D71,098 | S | * | 9/1926 | Banner et al. | D23/409 |
| 2,107,054 | A | * | 2/1938 | Haymond | 44/519 |
| 3,532,477 | A | | 10/1970 | De Capitani | |
| 3,637,355 | A | * | 1/1972 | Brockbank | 44/535 |
| 3,988,121 | A | * | 10/1976 | Leveskis | 44/530 |
| 4,061,133 | A | * | 12/1977 | Swain | 126/514 |
| 4,189,305 | A | | 2/1980 | Clayton | |
| 4,243,394 | A | * | 1/1981 | Kincaid | 44/521 |
| 4,485,584 | A | | 12/1984 | Raulerson et al. | |
| 4,539,011 | A | * | 9/1985 | Kretzschmann | 44/270 |
| 4,810,255 | A | * | 3/1989 | Fay et al. | 44/530 |
| 4,818,249 | A | * | 4/1989 | Barrett, Jr. | 44/530 |
| D311,578 | S | | 10/1990 | MacIsaac | |
| D344,584 | S | * | 2/1994 | Carney | D23/410 |
| D362,655 | S | | 9/1995 | Bain | |
| 5,743,248 | A | | 4/1998 | Jansen, Jr. | |
| D412,368 | S | | 7/1999 | Gazzola et al. | |
| 5,958,090 | A | * | 9/1999 | Chandaria | 44/535 |
| D429,350 | S | | 8/2000 | Tingley | |
| 6,740,135 | B2 | * | 5/2004 | Thompson | 44/530 |
| 6,899,740 | B2 | * | 5/2005 | Rast et al. | 44/531 |
| 8,250,995 | B2 | * | 8/2012 | Lee | 110/317 |
| 8,425,634 | B2 | * | 4/2013 | Parker | 44/606 |
| 8,597,381 | B2 | * | 12/2013 | Paapsi | 44/522 |
| D700,569 | S | | 3/2014 | Payne | |
| 2003/0070349 | A1 | | 4/2003 | Thompson | |
| 2005/0016062 | A1 | * | 1/2005 | Bonnell-Rickard et al. | 44/535 |
| 2006/0162244 | A1 | | 7/2006 | Hsiao | |
| 2006/0230673 | A1 | * | 10/2006 | Barford et al. | 44/535 |
| 2009/0307968 | A1 | | 12/2009 | Parker | |
| 2012/0090227 | A1 | * | 4/2012 | Lush | 44/535 |
| 2012/0304533 | A1 | | 12/2012 | Paapsi | |

FOREIGN PATENT DOCUMENTS

| | | | |
|---|---|---|---|
| DE | 2001115 | | 4/2000 |
| DE | 20001115 | | 4/2000 |
| GB | 17327 | | 0/1898 |
| JP | 2002338978 | A | 11/2002 |

OTHER PUBLICATIONS

Photos of "Lappish Candle," source and date unknown, 4 pages.
Screenshots from "How to make a fire log," video uploaded by MarcelsWorkshop on Jul. 9, 2011, http://www.youtube.com/watch?v=emm_DBKTi3k&feature=fvwrel on Apr. 19, 2012, 9 pages.
Screenshots from "The fire log," video uploaded by the Wild North on Jul. 9, 2010, http://www.youtube.com/watch?v=jajQ9gl7Kw4 on Apr. 19, 2012, 6 pages.

* cited by examiner